Patented May 29, 1951

2,554,857

UNITED STATES PATENT OFFICE 2,554,857

FLUOROCHLOROBUTANES

Carl I. Gochenour, Niagara Falls, N. Y., assignor to Hooker Electrochemical Company, Niagara Falls, N. Y., a corporation of New York No Drawing. Application August 2, 1947, Serial No. 765,811

2 Claims. (Cl. 260—653)

This application is a continuation-in-part of application Serial No. 593,775, filed May 14, 1945, now Patent No. 2,436,357, Carl I. Gochenour and Glendon D. Kyker.

This invention relates more particularly to substiution of fluorine for chlorine in hexachlorbutadiene by reaction with antimony pentafluoride, or hydrogen fluoride in presence of a catalyst, and treatment of the resulting fluorochlorobutene with cobalt trifluoride to add fluorine thereto.

It is known that in presence of a catalyst such as an antimony halide the fluorine of hydrogen fluoride readily replaces more or less of the chlorine in the alkyl groups of alicyclic hydrocarbons or attached to primary carbon atoms of saturated acyclic hydrocarbons. It is also known that if the catalyst is an antimony halide the reaction is promoted by presence of free chlorine, under which conditions it is possible to replace with fluorine more or less of the chlorine atoms attached to secondary carbon atoms of saturated acyclic hydrocarbons. It has been found, moreover, that in presence of antimony pentahalide and free chlorine, hydrogen fluoride will react with tetrachlorethylene to produce tetrafluordichlorethane or trifluortrichlorethane. The product is therefore saturated.

In this present application, it is shown that in presence of antimony pentahalide, and preferably pentachloride, and free chlorine, hydrogen fluoride reacts with hexachlorbutadiene in accordance with the following theoretical reactions:

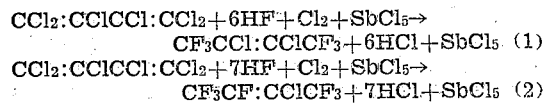

In practice, it is necessary to use an excess of hydrogen fluoride in these reactions, and this displaces some of the chlorine of the catalyst, which is therefore recovered as antimony pentafluoride.

In this case the two double bonds of the butadiene are saturated with fluorine and a new double bond is established at the middle or No. 2 position of the molecule, where before there was a single bond, the product being therefore still unsaturated. This is a curious and unpredictable result, entirely unlike that obtained in the fluorination of ethylene.

Example I

Seventy pounds of hexachlorbutadiene and 35 pounds of antimony pentachloride were charged into a ten gallon nickel clad jacketed reactor provided with an agitator, reflux condenser, thermometer well and inlets for vaporized hydrogen fluoride and chlorine, extending to near the bottom of the reactor. The condenser was in two parts, the first water cooled and the second cooled by means of "dry ice," or solid carbon dioxide, in alcohol. In the refluxing pipe connection a bypass was provided leading to a receiver, also cooled by means of Dry Ice. The contents of the reactor were agitated and heated to 40° C., at which temperature vaporized anhydrous HF was passed into the liquid contents of the reactor at the rate of 2½ pounds per hour, until 12 pounds had been added. The admission of HF was then discontinued and gaseous chlorine admitted under similar conditions until 10 pounds of chlorine had been added. The admission of HF and chlorine was continued alternately, by increments of 10 pounds of each, until a total of 32 pounds of HF and 20 pounds of chlorine had been admitted, this being the theoretical quantity of HF necessary to replace four atoms of chlorine per molecule of hexachlorbutadiene with fluorine and saturated the two double bonds with fluorine, and 73 per cent of the theoretical quantity of chlorine necessary to maintain the catalyst in the pentavalent state under the conditions of the reaction. During this process the temperature was maintained at 40° to 60° C., and the low boiling constituents were refluxed back into the reactor.

The above described process having consumed about 20 hours, at its conclusion the temperature of the liquid contents of the reactor was slowly raised to 120° C., during which time the distillate was collected in the receiver. The crude distillate, which weighed 17.5 pounds, was washed free of acid and catalyst and dried and filtered.

The liquid remaining in the reactor was then further treated as follows: With the temperature held at 40° to 60° C., 4.5 pounds more chlorine were passed into the liquid and then a mixture of chlorine and anhydrous HF was passed into the liquid until a total of 18 pounds of additional HF and 12.5 pounds of additional chlorine had been introduced, in a period of 8 hours, with refluxing as before. The temperature was thereupon allowed to rise slowly to 126° C., the distillate being collected in the receiver and washed dried and filtered as before. From the second treatment 14.3 pounds of crude distillate were obtained.

The two batches of crude distillate were then rectified separately in a 6 ft. by 1½ inch packed column and the following fractions recovered:

| Boiling Range of Fraction | Fraction, Per Cent of Total | |
|---|---|---|
| | 1st distillate | 2d distillate |
| 33°–35° C | 3.64 | 5.90 |
| 35°–66° C | 7.65 | 4.36 |
| 66°–68° C | 58.20 | 58.40 |
| Residue | 30.91 | 31.34 |

These fractions analyzed as follows:

| Boiling Range of Fraction | Analysis of Fraction | |
|---|---|---|
| | Per Cent Fluorine | Per Cent Chlorine |
| 33°–35° C | 54.4 (7)(11) | 21.0 (8)(12) |
| 66°–68° C | 48.6 (9) | 30.9 (10) |

(7) Per cent fluorine in heptafluormonochlorbutene, 61.5.
(8) Per cent chlorine in heptafluormonochlorbutene, 16.4.
(9) Per cent fluorine in hexafluordichlorbutene, 48.9.
(10) Per cent chlorine in hexafluordichlorbutene, 30.9.
(11) Per cent fluorine in hexafluormonochlorbutene, 57.5.
(12) Per cent chlorine in hexafluormonochlorbutene, 17.9.

These analyses show clearly that the fraction boiling at 66°–68° C. consisted almost exclusively of hexafluordichlorbutene. The fraction boiling at 33°–35° C. was not so sharp a cut, but nevertheless, obviously contained a considerable percentage of heptafluoromonochlorbutene. I have now found that its also contained a considerable proportion of hexafluoromonochlorbutene. The intermediate fraction, boiling at 35° to 66° C. was a mixture of all three of these products. The hexafluordichlorbutene can be largely recovered by another fractionation. The hexafluormonochlorobutene, boiling at 33.5° C., can then be separated from the heptafluormonochlorbutene. The residue consisted of partially reacted hexachlorbutadiene. This may be recycled.

The total yields of these products were as follows:

| | Grams | Yield |
|---|---|---|
| Hexafluordichlorbutene | 8,440 | 29.60 (13) |
| Heptafluormonochlorbutene and Hexafluormonochlorbutene mixture | 644 | 2.45 (13) |

(13) Per cent conversion of the hexachlorbutadiene.

These yields are, however, not to be considered as typical, as they do not include the products recoverable from the intermediate fraction by further fractionation, nor those which may be made from the recycled residue.

Hexachlorbutadiene can also be fluorinated to produce the same end products by reaction with antimony pentafluoride, in accordance with the following recation:

$CCl_2:CClCCl:CCl_2 + 3SbF_5 \rightarrow$
$\quad CF_3CCl:CClCF_3 + 2SbF_3Cl_2 + SbF_3$ (3)
$2CCl_2:CClCCl:CCl_2 + 7SbF_5 \rightarrow$
$\quad 2CF_3CF:CClCF_3 + 5SbF_3Cl_2 + 2SbF_2$ (4)

Example II

In an apparatus similar to that described in connection with Example I, antimony pentafluoride was added gradually to hexachlorbutadiene with agitation. The reaction was spontaneous and quite exothermic. The rate of addition of the antimony pentafluoride was regulated to maintain refluxing. The refluxing temperature reached about 70° C. The products were distilled from the reactor and fractionated as in the previous example. Analysis showed the products to be the same as those of reactions (1) and (2).

One molecule of the hexafluorodichlorbutene, heptafluormonochlorbutene or hexafluormonochlorbutene produced by this process can be oxidized, with elimination of the halogen attached to the secondary carbon atoms, to two molecules of identical product, thus proving that they are of the structure 1,1,1,4,4,4, hexafluor 2,3 dichlorbutene; 1,1,1,2,4,4,4, heptafluor 3 monochlorbutene and 1,1,1,4,4,4, hexafluor 3 monochlorbutene respectively. These are believed to be new chemical compounds.

These products can be further fluorinated by reaction with cobalt trifluoride in known manner as follows:

$CF_3CCl:CClCF_3 + 2CoF_3 \rightarrow$
$\quad CF_3CFClCFClCF_3 + 2CoF_2$ (5)
$CF_3CF:CClCF_3 + 3CoF_3 \rightarrow$
$\quad CF_3CF_2CFClCF_3 + 3CoF_2$ (6)

Example III

A thin layer of hydrated cobalt difluoride ($CoF_2.2H_2O$) was placed on the flat bottoms of three closed, elongated containers, electrically heated and joined together by pipes to form a continuous closed series. With the containers at about 200° C., gaseous fluorine was passed through the containers to bring the cobalt up to the trifluoride. The containers were purged of fluorine by passing gaseous nitrogen therethrough. Liquid hexafluordichlorbutene was then passed into the first container and there vaporized. With the temperature of the containers maintained at 165° to 216° C., the vapor was passed through the successive containers, in contact with the cobalt trifluoride. The product issuing from the last container was condensed at the temperature of solid carbon dioxide in alcohol. The crude product was washed, dried and fractionated, and the fraction boiling at 58° to 59.5° C., collected. It was a water white, nearly odorless, liquid, having a refractive index of 1.3156 at 8° C. and containing 53 per cent fluorine and 25 per cent chlorine. This corresponds closely to octafluordichlorbutane, which has a theoretical fluorine content of 55 per cent and a theoretical chlorine content of 26 per cent.

The products of reactions (5) and (6), namely 1,1,1,2,3,4,4,4, octafluor-2,3 dichlorbutane and 1,1,1,2,2,3,4,4,4, nonafluor 3 monochlorbutane are likewise believed to be new chemical compounds.

These products are useful as solvents and also as intermediates in organic syntheses, as well as for production of certain oxidation products, as disclosed and claimed in Patent Number 2,414,706.

For some purposes, such as solvents, the products obtained by my process can be used without fractionation.

Although I have described my process in one of its embodiments as exemplified by the use of antimony pentachloride as the preferred halogenation catalyst, if preferred, antimony trichloride may be used at the start of the reaction, as it will become oxidized largely to the pentachloride; also in presence of free chlorine the corresponding fluorides and bromides may be used. It should also be noted that in use the antimony chloride becomes gradually converted to antimony fluorochloride, in which form it is equally serviceable.

I claim as my invention:

1. The process for production of octafluordichlorbutane which comprises contacting 1,1,1,-4,4,4-hexafluor-2,3-dichlorbutene with cobalt trifluoride, to add a fluorine atom to each secondary carbon atom.

2. As a new chemical compound 1,1,1,2,3,4,4,4, octafluor 2,3, dichlor butane.

CARL I. GOCHENOUR.

REFERENCES CITED

The following references are of record in the file of this patent:

UNITED STATES PATENTS

| Number | Name | Date |
| --- | --- | --- |
| 2,005,710 | Daudt et al. | June 18, 1935 |
| 2,384,449 | Benning et al. | Sept. 11, 1945 |
| 2,407,246 | Benning et al. | Sept. 10, 1946 |
| 2,436,357 | Gochenour et al. | Feb. 17, 1948 |

OTHER REFERENCES

Henne et al.: J. A. C. S., 67, 1906–8 (1945).

Miller et al.: Ind. & Eng. Ch., 39, 404.

Fowler et al.: "Ind. & Eng. Chem.," vol. 39, pages 292–8 (1947).

McBee et al.: "Ind. & Eng. Chem.," vol. 39, pages 310–3 (1947).

Miller et al.: "Ind. & Eng. Chem.," vol. 39, pages 333–7 (1947).